US008138971B2

(12) United States Patent  
Oehler

(10) Patent No.: US 8,138,971 B2  
(45) Date of Patent: Mar. 20, 2012

(54) METHOD AND DEVICE METHOD FOR DETECTING FREQUENCY JUMPS OF A NAVIGATION SATELLITE'S MASTER CLOCK

(75) Inventor: Veit Oehler, Neubiberg (DE)

(73) Assignee: Astrium GmbH, Taufkirchen (DE)

( * ) Notice: Subject to any disclaimer, the term of this patent is extended or adjusted under 35 U.S.C. 154(b) by 215 days.

(21) Appl. No.: 12/568,361

(22) Filed: Sep. 28, 2009

(65) Prior Publication Data

US 2010/0079340 A1 Apr. 1, 2010

(30) Foreign Application Priority Data

Sep. 29, 2008 (EP) ..................... 08017095

(51) Int. Cl.
*G01S 19/02* (2010.01)
(52) U.S. Cl. ................................. 342/357.395
(58) Field of Classification Search ........... 342/357.395, 342/357.45, 357.58
See application file for complete search history.

(56) References Cited

U.S. PATENT DOCUMENTS

| 6,194,970 | B1 * | 2/2001 | Nielsen et al. .................. 331/16 |
| 6,667,713 | B2 * | 12/2003 | Green et al. .............. 342/357.31 |
| 7,019,687 | B1 * | 3/2006 | Schempp et al. ...... 342/357.395 |
| 7,570,203 | B2 * | 8/2009 | Trautenberg ............. 342/357.45 |
| 7,576,691 | B2 * | 8/2009 | Trautenberg et al. .... 342/357.45 |

FOREIGN PATENT DOCUMENTS

EP 1637899 A1 * 3/2006

OTHER PUBLICATIONS

Galileo Open Service Signal in Space Interface Control Document (OS SIS ICD) Draft 0 European Space Agency / Galileo Joint Undertaking May 23, 2006.*
European Search Report dated Apr. 3, 2009 (Seven (7) pages).
Christophe Bourga, et al., "Experimental Assessment of Galileo Clocks Performance in Space", Proceedings of Ion GPS/GNSS, Sep. 24-27, 2002, pp. 2216-2224, XP007907978.
Qinghua Wang, et al., "Backup Hydrogen Maser Steering Algorithm for Galileo Precise Timing Facility", Frequency Control Symposium, 2007 Joint With the 21$^{st}$ European Frequency and Time Forum, IEEE International, IEEE PI. May 1, 2007, pp. 463-466, XP031138006 ISBN: 978-1-4244-0646-3.
Ryan T. Dupuis, et al., "Rubidium Frequency Standard for the GPS IIF Program and Modifications for the RAFSMOD Program", Frequency Control Symposium, 2008 IEEE International, IEEE, Piscataway NJ, USA, May 19, 2008, pp. 655-660, XP031319950 ISBN: 978-1-4244-1794-0.
Renzo Zanello, et al., "The Galileo Precise Timing Facility", 1-4244-0647, Frequency Control Symmposium, 2007 Joint With the 21$^{st}$ European Frequency and Time Forum. IEEE International, IEEE, PI., May 1, 2007, pp. 458-462, XP031138005 ISBN: 978-1-4244-0646-3.
R. Beard, et al., "GS Block IIR Rubidium Frequency Standard Life Test Results", 2002 IEEE International Frequency Control Symposium and PDA Exhibition, May 29, 2002, pp. 499-504, XP010618993, ISBN: 978-0-7803-7082-1.

* cited by examiner

*Primary Examiner* — Thomas Tarcza
*Assistant Examiner* — Cassie Galt
(74) *Attorney, Agent, or Firm* — Crowell & Moring LLP

(57) ABSTRACT

A method for detecting frequency jumps of a navigation satellite's master clock, comprising the steps of i) monitoring the master clock signal that is generated by a master clock onboard of the satellite for a frequency jump, and ii) signaling a detected frequency jump of the master clock signal.

15 Claims, 7 Drawing Sheets

| Type=5 | | 6 |
|---|---|---|
| Az | $a_{i0}$ | 11 |
| | $a_{i1}$ | 11 |
| | $a_{i2}$ | 14 |
| Ionospheric disturbance flag | Region 1 | 1 |
| | Region 2 | 1 |
| | Region 3 | 1 |
| | Region 4 | 1 |
| | Region 5 | 1 |
| BGD(L1,E5a) | | 10 |
| BGD(L1,E5b) | | 10 |
| $E5b_{HS}$ | | 2 |
| $L1B_{HS}$ | | 2 |
| $E5b_{DVS}$ | | 1 |
| $L1B_{DVS}$ | | 1 |
| GST | WN | 12 |
| | TOW | 20 |
| Spare | | 23 |

(First column "Ionospheric correction" spans the rows from Az through Ionospheric disturbance flag.)

| Total [bits] | 128 |
|---|---|

Fig. 5

METHOD AND DEVICE METHOD FOR DETECTING FREQUENCY JUMPS OF A NAVIGATION SATELLITE'S MASTER CLOCK

This application claims the priority of European patent application No. 08 017 095.4, filed Sep. 29, 2008, the disclosure(s) of which is expressly incorporated by reference herein.

FIELD OF THE INVENTION

The invention relates to a method for detecting frequency jumps of a navigation satellite's master clock.

BACKGROUND OF THE INVENTION

All satellite navigation systems rely on very stable satellite clock performances to allow accurate clock behavior prediction. Through dedicated clock parameters, that are estimated on the ground based on measurements over long intervals (e.g., 1-2 days) and are transmitted to a user system via the ranging signal, the user system is able to predict such clock behavior and to use this information for its positioning solution. However, unpredictable events cannot be modeled and thus compensated at user level, and degrade directly the achievable ranging accuracy, since additional biases due to such events need to be considered. In particular, early test results of the planned European satellite navigation system Galileo as well as factory tests have shown that Rubidium clocks, which are already used in the Galileo test satellites (GIOVE-A/-B) and which will be used in 10V (In Orbit Validation) and FOC (Full Operational Capability), are affected by unpredictable frequency jumps, typically at a rate of 1-2 events per month. Such jumps affect the ranging accuracy around 1 meter to 10 meters, which has a major impact on all Galileo services.

For typical positioning services, such as the Open Service (OS) of Galileo this effect is less critical, since not all users are always affected, and jumps also occur only from time to time. Therefore the effect can be compensated, or at least mitigated, by averaging over Galileo's system lifetime (i.e., 20 years). It will, nevertheless, degrade the OS performance.

However, for users of Galileo's integrity system, such as Safety-of-Life (SOL) and Public Regulated Service (PRS) users, such averaged compensation is not possible, since a certain accuracy of the individual ranging signal must be ensured with very high degree of confidence. Thus, all integrity information for each satellite, and all of the time, would need to be inflated by the worst-case effect that might occur according to clock frequency jumps. This would destroy any integrity performance, and would therefore jeopardize the related major Galileo services.

If warnings were broadcast to all users not to consider signals that are affected by frequency jumps, it would improve dramatically the situation, and would allow for feasible Galileo integrity service performances again. It would, of course, still affect the availability of the service, since satellites would be flagged as 'don't use' from time to time, and continuity event rate might be increased, but the problem is transferred from a critical integrity problem (wrong information sent to the user that might cause wrong positioning solutions and could lead to hazardous events) to a pure availability problem, which is not safety critical. Therefore, frequency jumps must be detected, and a warning sent to the user to ensure the Galileo integrity services.

Due to the relatively small errors that are imposed by frequency jumps (on the order of a few meters), the typical integrity monitoring that is done on the ground is hardly able to detect such frequency jumps and cannot inform the integrity user accordingly. A method to properly detect the satellite frequency jumps, to provide related information to the user, and to properly apply the information, is necessary to ensure a feasible Galileo integrity service accordingly.

SUMMARY OF THE INVENTION

One object of the invention is to provide a method and device for detecting frequency jumps of a navigation satellite's master clock.

This and other objects and advantages are achieved by the method and apparatus according to the invention, which is based on the idea of detecting frequency jumps of a navigation satellite's master clock onboard the satellite. Thus, a navigation satellite is able to autonomously monitor its master clock performance and to signal detected frequency jumps to the user level, so that, for example, a receiver of navigation messages from the satellite may decide how to process the navigation data received with the navigation message.

An embodiment of the invention provides a method for detecting frequency jumps of a navigation satellite's master clock, comprising
   monitoring the master clock signal (which is generated by the master clock) onboard of the satellite for a frequency jump; and
   signaling a detected frequency jump of the master clock signal.

This technique allows the performance of parts of for example the integrity monitoring function directly onboard of a satellite, with respect to satellite frequency jumps.

The monitoring can comprise
   comparing the frequency of the master clock signal with the frequency of a backup clock signal, which is generated by a backup clock, onboard of the satellite for detecting a frequency jump of a clock signal;
   comparing a detected frequency jump with a threshold; and
   if the detected frequency jump exceeds the threshold generating a frequency jump detection event.

The comparing of the frequencies can comprise
   estimating the frequency of each clock signal based on phase measurement values of the respective clock signal; and
   comparing the estimated frequencies of both clock signals;
   wherein the comparing of a detected frequency jump with a threshold comprises
   detecting a difference between the estimated frequencies;
   comparing the detected difference with the threshold; and
   generating the frequency jump detection event if the detected difference exceeds the threshold.

The threshold may be implemented as a remotely configurable parameter.

The monitoring may comprise estimating the frequency of the master clock signal by means of a reference clock signal, which is generated by a reference clock onboard of the satellite.

A detected frequency jump of the master clock signal may be signaled by setting a flag in a navigation message broadcasted by the satellite. (The Data Validity Status—DVS—Flag, which is foreseen in the Galileo global navigation satellite system to announce events, may be used as the flag.) Signaling of a detected frequency jump of the master clock signal may also include signaling of the used master clock type and/or a threshold, which is implemented onboard the satellite for monitoring the frequency jump of the master clock signal, at the user level of a global navigation satellite system.

A further embodiment of the invention provides a device for detecting frequency jumps of a navigation satellite's master clock, such device comprising:
- a monitoring unit adapted for monitoring the master clock signal, which is generated by the master clock, onboard of the satellite, for a frequency jump; and
- a frequency jump signaling unit adapted for signaling a detected frequency jump of the master clock signal.

The device can be adapted for performing a method of the invention and as described above.

In a further embodiment of the invention, a navigation satellite is provided, which comprises a device of the invention, as described before.

Another embodiment of the invention relates to a receiver for receiving navigation messages from a navigation satellite of the invention, as described above, which is adapted for processing a received navigation message by
- detecting a signaling of a detected frequency jump of the master clock signal of the satellite in the navigation message from the satellite; and
- either excluding navigation messages from satellite or inflating the relevant signal in space accuracy—SISA—information.

The receiver can be adapted to inflate the relevant SISA according to the following equation:

$$SISA_i = \sigma \cdot e^{\frac{b^2}{2 \cdot \sigma^2}},$$

wherein b is a bias in meters and a is the standard deviation of the underlying Gaussian distribution.

The SISA received with a navigation message from the satellite may be used as the standard deviation σ and the threshold applicable for frequency jumps of the satellite's master clock may be used as bias b.

The receiver can be further adapted to consider the age of the navigation data received with a navigation message for inflating the relevant SISA information.

Other objects, advantages and novel features of the present invention will become apparent from the following detailed description of the invention when considered in conjunction with the accompanying drawings.

BRIEF DESCRIPTION OF THE DRAWINGS

FIG. 5 shows the currently I/NAV message page which also includes the GVS; and

DETAILED DESCRIPTION OF EMBODIMENTS

Figure 1:
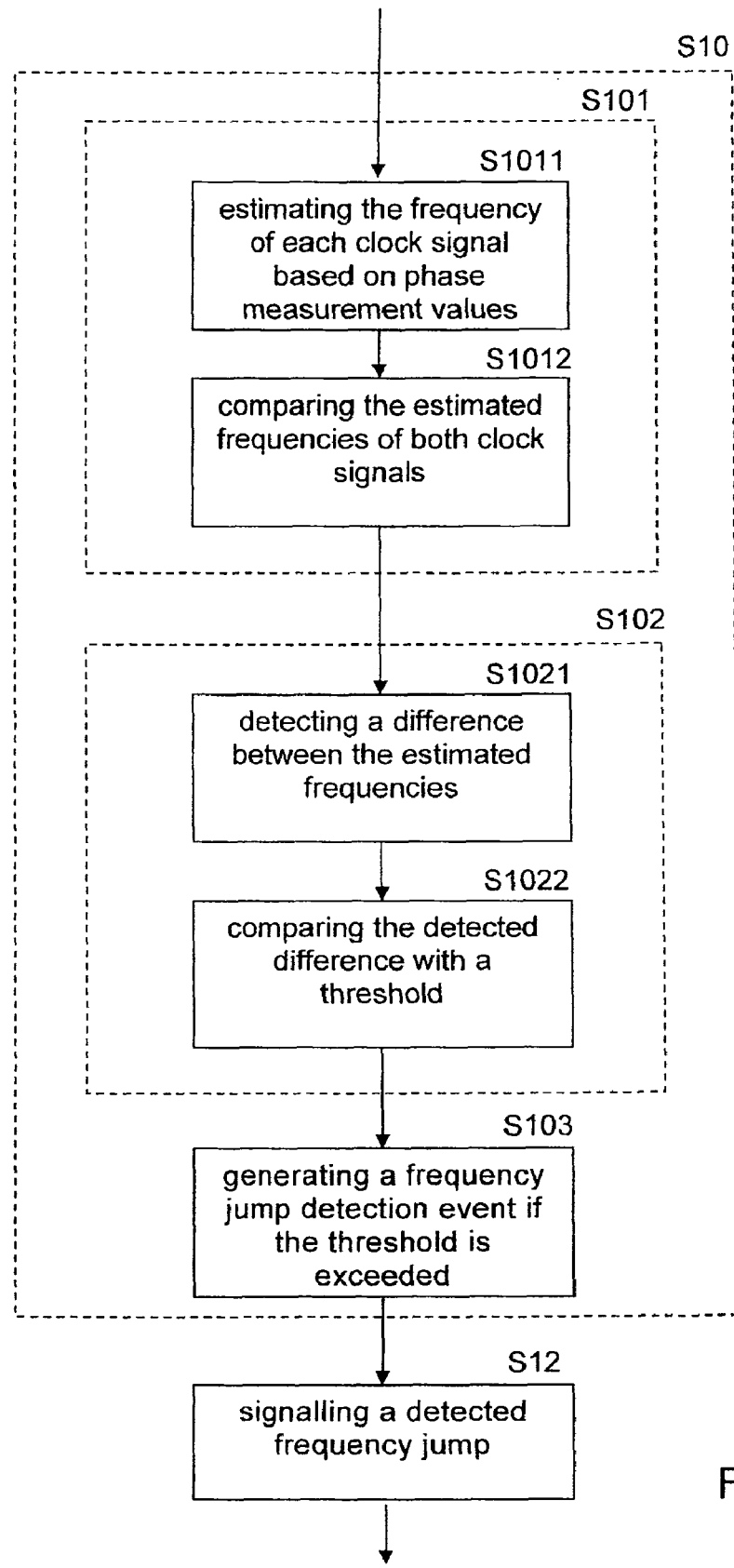
FIG. 1 is a flowchart that shows the steps of an embodiment of a method for detecting frequency jumps of a navigation satellite's master clock according to the invention.
Figure 2A:
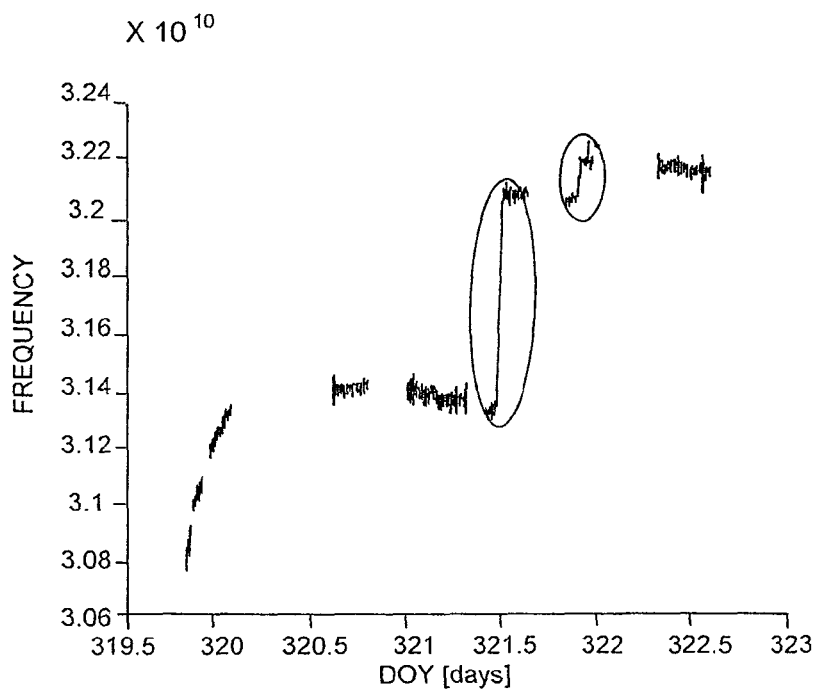
FIG. 2 shows measurement results from GIOVE measurement campaigns for demonstrating the occurrence of clock frequency jumps for rubidium clocks.
Figure 2B:
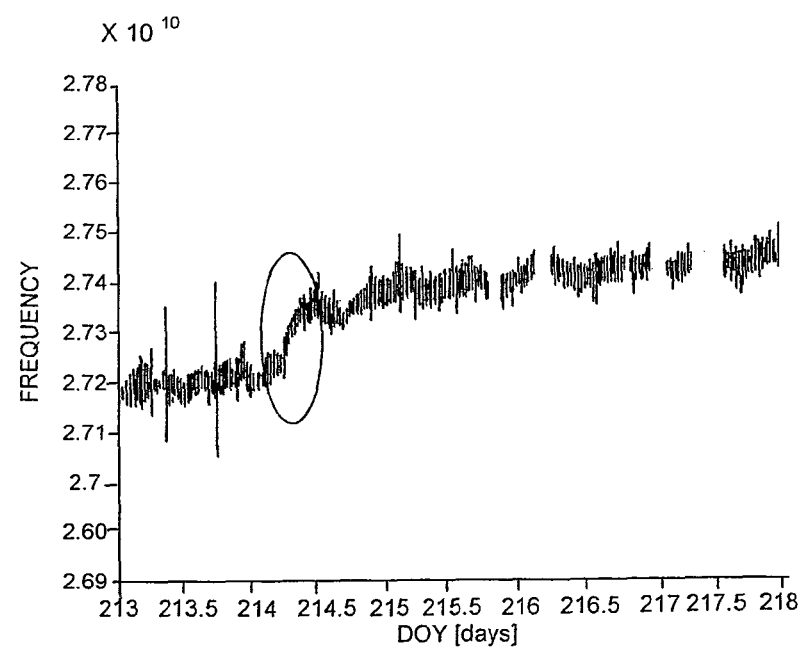
Figure 2C:
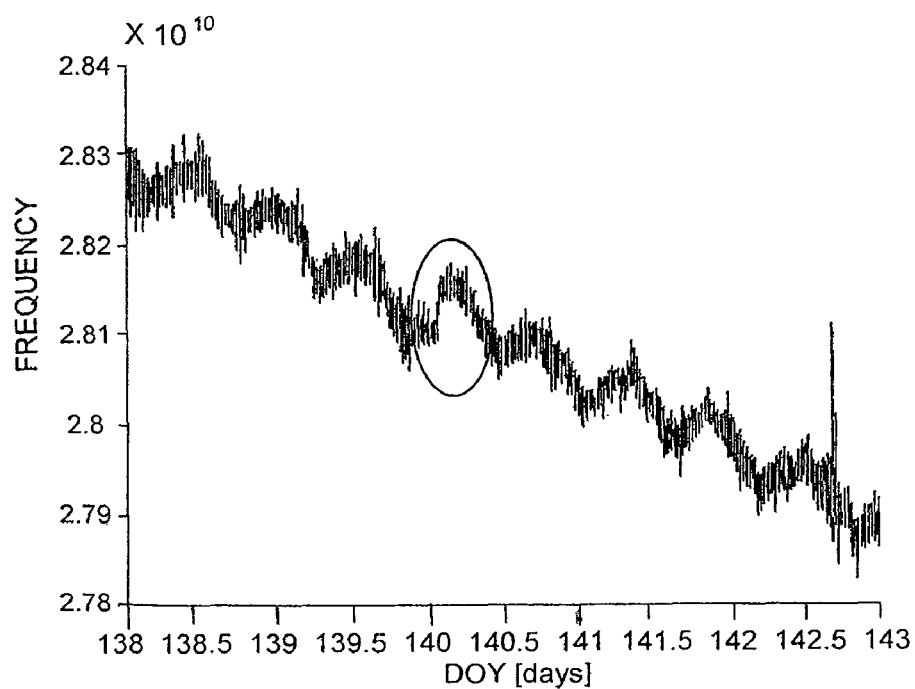
Figure 2D:
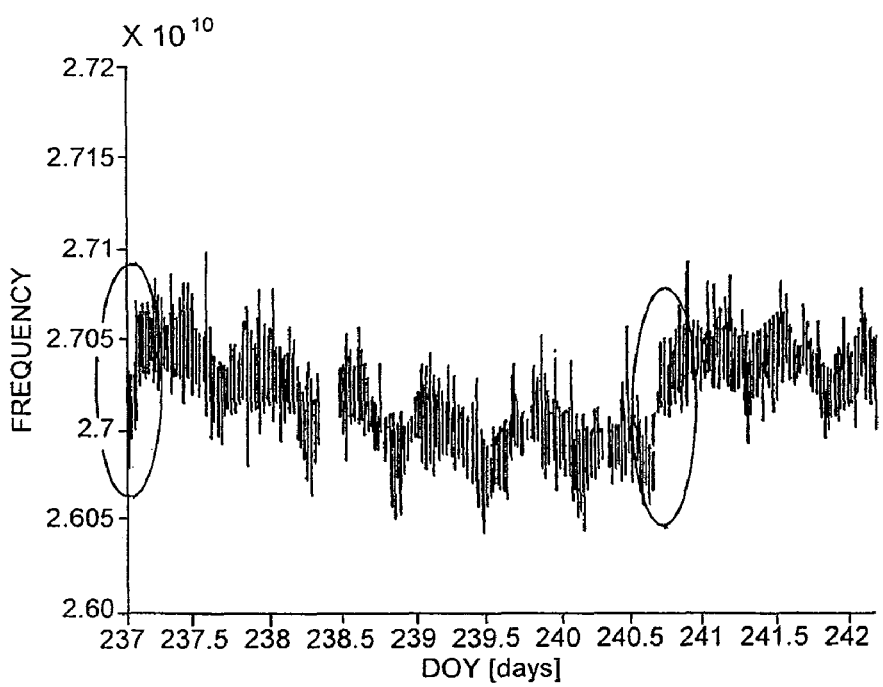

The embodiments of the invention are explained with reference to the Global Navigation Satellite System (GNSS) Galileo, but may be in principle applied to any GNSS, particularly in order to improve the integrity system of a GNSS. In the following, the term "user" means a user system such as a receiver for navigation messages from satellites of a GNSS.

With the invention, the problem that small errors on the order of a few meters, which are attributable to satellite clock frequency jumps and cannot be detected by the Galileo ground integrity monitoring concept, may be overcome. According to the invention, such integrity monitoring shall be done onboard the satellite, and the user shall be informed via flags that are directly set by ground segment of Galileo to the space segment.

Embodiments of the invention may be based on the current IOV and FOC satellite design, as well as the applicable system concepts (e.g., message design, integrity data and algorithms, etc.), in order to avoid a full re-design of the Galileo FOC satellites and to allow that already applicable IOV and FOC contract time schedule and budget constraints may be met.

According to an embodiment of the invention, the monitoring may be implemented onboard the satellite through comparison of the parallel activated master and backup clocks, to detect a frequency jump. This technique requires only minor design modifications, because IOV as well as FOC payload platforms are already able to monitor two activated clocks, and even to compare the phase of both. (Note that such data are transmitted via telemetry to the ground). Only the phase comparison capacity needs to be extended to frequency comparison in order to detect onboard frequency jumps, which is considered a minor change to the current design.

Furthermore, in an embodiment of the invention, the so called "Data Validity Status" flag (DVS), which is already implemented in the overall Galileo architecture, can be set directly by the satellite in order to signal a detected frequency jump of the master clock of the satellite. This flag is currently used to announce maneuvers, but is fully redundant to other flags that are well in advance set by the GMS (Ground Mission Segment) or GCS (Ground Control Segment), and is therefore not really used (no redundancy of barriers is required). This flag can directly be set by the satellite once a frequency jump has been detected. An onboard threshold for setting the DVS flag is to be configurable on ground in order to optimize the detection mechanism (clock jumps might deviate from clock to clock), i.e., miss-detection vs. false alert rate. Various spare bits are available that can be also used to transmit the relevant information (jump flag, but also master clock type information, and threshold magnitude), which is also only considered as minor change to the current design (SIS-ICD (Signal-In-Space Interface Control Document) optimization for bits that are spare anyway).

Since the DVS is updated at least every 30 seconds, the user would be informed almost immediately following a frequency jump, and can apply the information accordingly. Such a small period between jump and user warning (up to the order of a few minutes, since the onboard detection might also take some time) does not significantly affect the user. As soon as the flag is received, the satellite can be excluded, and the integrity of the provided information is thus ensured.

The onboard jump threshold which is used will drive the achievable signal-in-space accuracy, and must be considered for the integrity information of that satellite. That is, the signal-in-space accuracy (SISA) must be inflated to ensure overbounding of the real signal-in-space error. Such inflation must be done at user level to also allow optimized end-to-end use of the provided jump information according to the final user needs. In one embodiment of the invention, the impact on integrity service availability is further reduced by considering the age of the received navigation message.

The invention thus requires only small modifications for FOC and IOV at Space Segment as well as at overall System level (including GMS), to compensate from the most critical frequency jump behavior.

Next, a brief introduction into basic thoughts underlying the present invention follows.

The achievable service performance for GNSSs strongly depends on the predictability of the onboard satellite clocks and their performance. If such performance is degraded by unpredictable events such as onboard satellite clock frequency jumps, the finally achievable service performance at user level is directly affected.

From Galileo Phase CDE1 experimentation results and detailed analysis, and IOV and FOC clock tests, it is confirmed that clock frequency jumps will occur for rubidium clocks, which are part of the Galileo IOV as well as FOC satellite design.

Such confirmed effect has not been considered for the Galileo design so far and jeopardizes positioning accuracy, as well as integrity services, i.e., the complete Galileo design.

Especially for the integrity services (SOL and PRS) this effect is most severe since only big jumps in the order of 5-10 meters may be detectable with the current ground monitoring concept, but even smaller jumps would significantly affect the integrity services. This is caused by the signal-in-space accuracy (SISA) that is provided to the user as major integrity information and overbounds the real signal-in-space error (i.e., accuracy of the real measurement) with very high confidence. If additional errors as caused by the frequency jumps need to be considered, the SISA needs to be inflated accordingly to ensure such overbounding at user level. Jumps far below the detection capability of the ground segment would already inflate SISA to such high values, that no feasible SOL or PRS performance could be achieved, not even near the GSRD targets (i.e., the applicable service specification).

FIG. 1 is a flowchart that illustrates a method for detecting frequency jumps of a navigation satellite's master clock according to the invention. The method may be implemented as software that is executed by a processor of a satellite, and processes clock measurement values and the generation of alerts for detected clock frequency jumps. The shown method comprises the two general steps S10—monitoring the master clock signal, which is generated by the master clock, onboard of the satellite for a frequency jump—and S12—signaling a detected frequency jump of the master clock signal. Step S10 is further subdivided in the steps S5101, S102 and S103. In step S101, the frequency of the master clock signal of the satellite is compared with the frequency of a backup clock signal generated by a backup clock of the satellite, to detect a frequency jump of the clock signal. (The comparison is performed onboard of the satellite.) In steps S102, a frequency jump detected in step S101 is compared with a threshold. In this step, it is decided whether or not a detected frequency jump is signaled. In the following step S103, a frequency jump detection event is generated if the detected frequency jump exceeds the threshold. Otherwise, no frequency jump detection event is generated.

Step S101 is further subdivided in two steps S1011 and S1012: in step S1011, the frequency of each clock signal is estimated based on phase measurement values of the respective clock signal. Thus, existing equipment for phase measurement onboard of a satellite may be used, instead of applying dedicated equipment for frequency measurements. In step S1012, the estimated frequencies of both clock signals are then compared. Also, step S102 is subdivided in steps S1021 and S1022: in step S1021, the difference between the estimated frequencies is detected, and the detected difference is compared with the threshold in step S1022.

Now, it will be described how to recover from the effects of frequency jumps at various levels to limit the impact of satellite clock frequency jumps on the divided in the following sections, which describe:

1. the already measured satellite clock frequency jump effect and impact at user level in the range domain;
2. how to measure and detect possible frequency jumps onboard the satellite;
3. how to use already available navigation data to inform users about the detection, and how to update the navigation message to further improve the current satellite clock frequency jump problem; and
4. how to properly use the provided information at user and ground mission segment (GMS) level, to compensate from the frequency jump problem as much as possible, in line with the relevant user needs.

1. Satellite Clock Frequency Jumps and Range Impact

As mentioned above, from Galileo Phase CDE1 and IOV experimentation results and IOV and FOC clock analysis it is confirmed that clock frequency jumps will occur for rubidium clocks, as measured and illustrated in FIG. 2 (from GIOVE measurement campaigns).

Since the user cannot model a-priori such behavior with the already provided clock parameters, an additional error will occur in the range domain to the affected satellite, depending on both the jump magnitude and the time between occurrence of the jump and receipt of new navigation data (currently specified to not more than 100 minutes) for that satellite.

Figure 3:
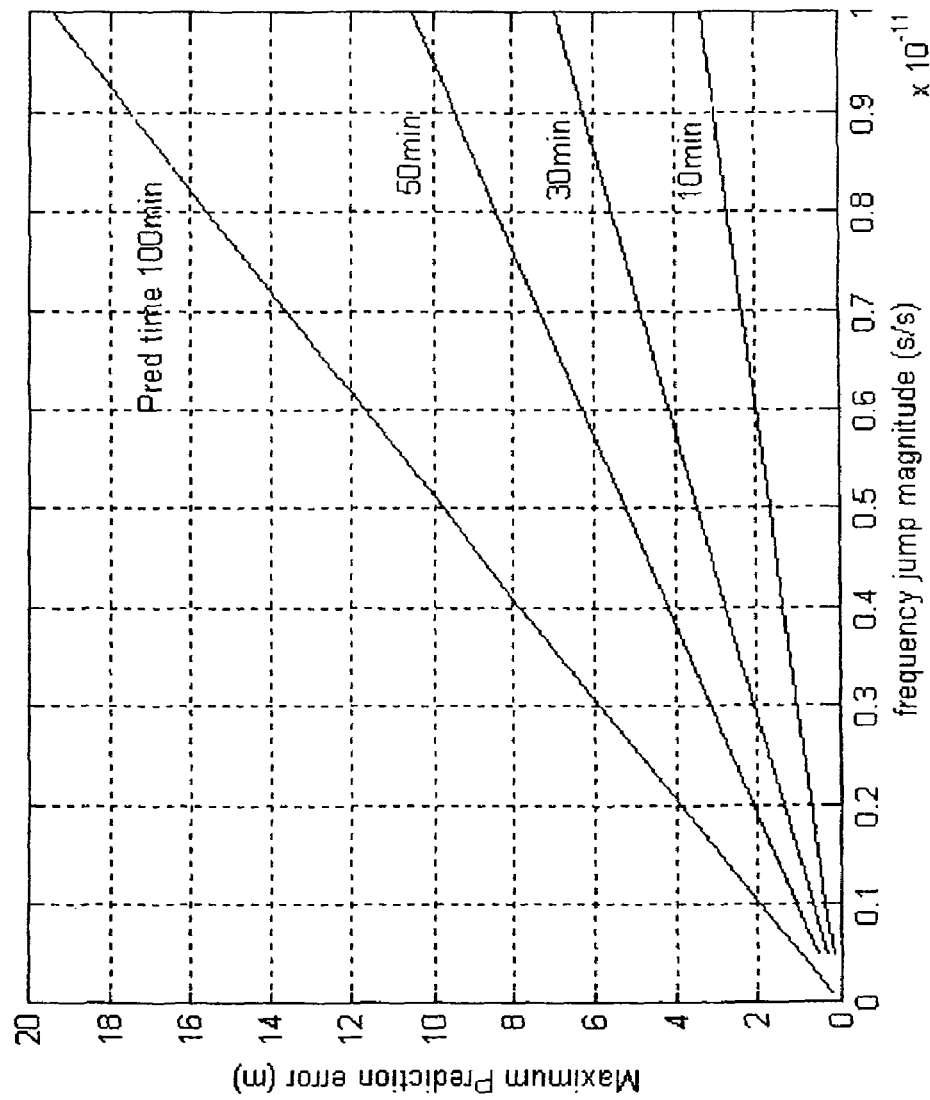
FIG. 3 shows the maximum prediction error in the range domain depending on the magnitude of frequency jumps and navigation message update rate or age of the message.

FIG. 3 presents the maximum prediction error in the range domain depending on the jump magnitude and navigation message update rate or age of the message.

Typical jumps in the order of around 1 e-12 s/s would therefore degrade the ranging accuracy for the affected satellite by around 2 meters in case of 100 minutes baseline navigation message update rate. For smaller update rates the imposed range error decreases.

Typically maximum prediction errors would need to be smaller than 50 cm to 100 cm to avoid an unacceptable degradation of the SISA performance, which must be inflated using such maximum prediction error as a bias.

Errors above such typical limit around 0.5-1 m need to be detected and excluded; otherwise the SISA would be destroyed. Typical ground mission segment (GMS) integrity monitoring thresholds are on the order of above 5 m (i.e., up to around one order of magnitude too high).

A different detection mechanism needs to be implemented that is able to detect frequency jumps in such order of magnitude.

2. Satellite Onboard Clock Monitoring

Figure 4:
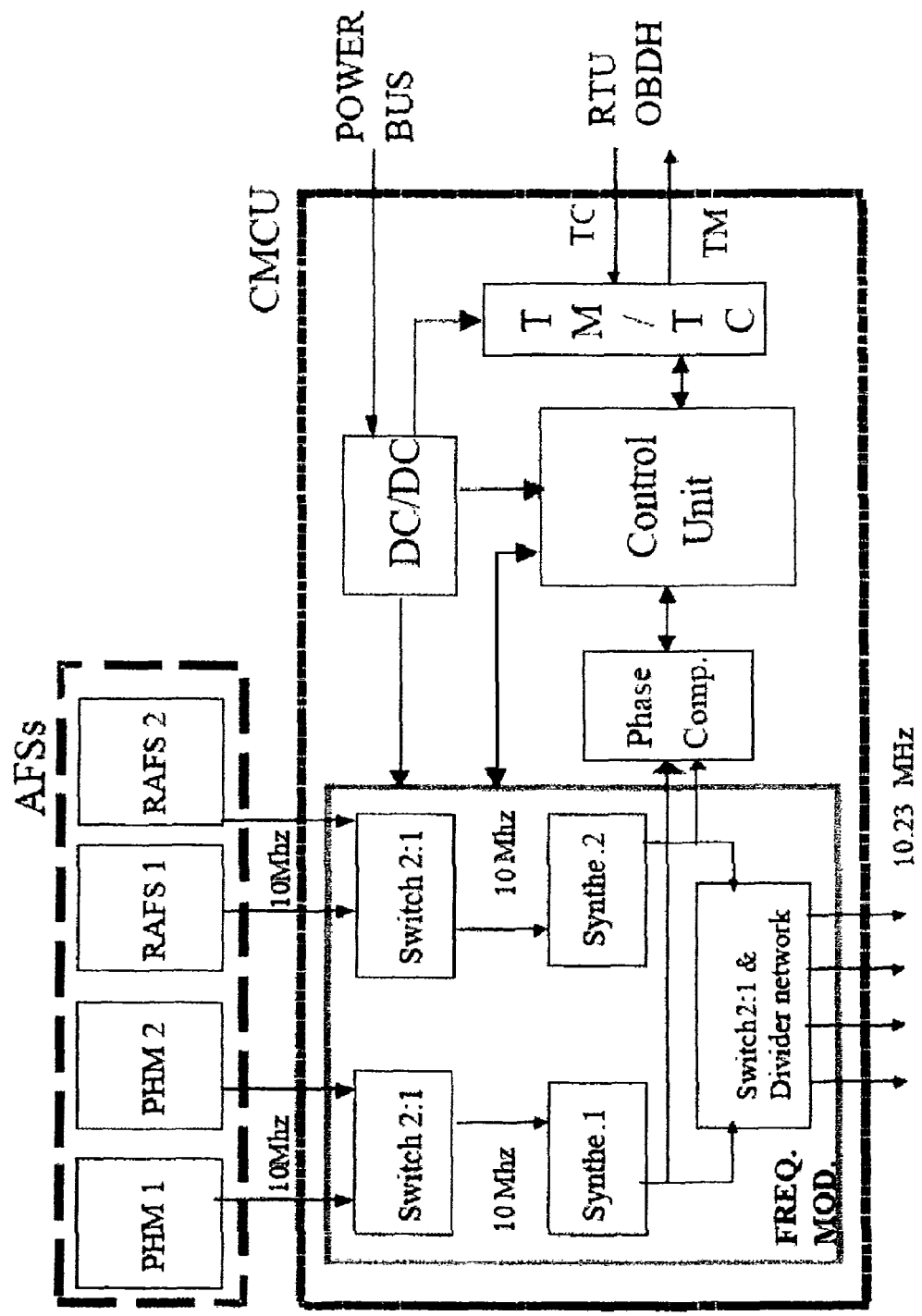
FIG. 4 is a schematic block diagram of an embodiment of a clock monitoring and control unit (CMCU) according to the invention.

The current Galileo IOV and FOC satellite design is already capable to measure the clock phase of two onboard satellite clocks and to compare both clock performances. Such information can be even provided to the ground via telemetry data, but only every several hours. Such clock phase comparison is done in the Clock Monitoring and Control Unit (CMCU) as illustrated in FIG. 4.

The two frequency outputs are compared by a phase meter in the CMCU, which measures the phase difference between the two reference signals with flexible sampling rate. Furthermore the measured values can be already stored up to 1000 samples, including sequence count. Only the master signal from the already selected master clock is selected as output to other payload units, i.e., no combination of input signals is currently foreseen.

To compare the frequency of the two input signals to enable frequency jump detection, the input frequency needs to be derived, (i.e., the CMCU design must be slightly modified). This could be done e.g., by simply estimating the frequency through subtraction of consecutive phase values and division by the relevant time between these consecutive values. The accuracy of such frequency estimation would then be directly proportional to the accuracy of the phase estimation. Also other means to measure the frequency of the signals could be implemented, but should only affect the CMCU design as little as possible.

An accumulation of the difference between two clocks results in an estimation of the difference between both frequencies. Therefore it cannot be detected which clock was affected by the frequency jump, i.e., the jump itself would be detected, but the cause is then not isolated. This would result in higher jump detection events, since both clocks would generate the event, whereas only in case of master clock frequency jump an alert should be raised. However, such increase in event rate might be acceptable depending on the final clock performance, as well as the jump magnitude threshold that could be considered acceptable at system level. Even if typically 'jumps' occur 1-2 times per month, jumps above such threshold might only occur e.g., 1-2 times per year, which might not need to be further solved/improved by more complex design modifications that also allow cause isolation.

However, if the impact is still further to be reduced it is proposed to estimate also the frequency for each clock separately, respectively as a minimum at least for the master clock. In this way, not only the difference between the two frequencies would be estimated, but also the individual frequency. This enables isolation of the cause, and actions (raise of warning flag) can only be taken if the master clock is affected. This could be done e.g., through the use of a third clock as reference, which would have bigger impacts on the CMCU, but also other options can be implemented to limit design changes as much as possible.

The onboard barrier/threshold for raising an alert can either be hard implemented, or could be implemented as configurable parameter via telemetry, which would allow flexible tuning of the threshold once the satellite has been launched and the real clock performance is measured. Also clock aging effects could be compensated with flexible barrier implementation.

3. Navigation Message Use and Possible Updates

Within the satellite the Navigation Signal Generation Unit (NSGU) receives the up-linked navigation data and stores, formats, encodes and modulates it before it is passed for up-conversion and final transmission to ground via the L-band Antenna. Also additional service status flags (and satellite health flags) are inserted into the navigation message, which can be set directly at the satellite level.

The so called Data Validity Status flag (DVS) is currently anticipated to be used to announce planned events such as maneuvers (only 1 bit), and can be either set directly by the satellite, or the GCS. With such flag, discontinuity events due to predictable occurrences can be avoided, i.e., it should be currently applied for integrity users only.

Since also other methods are already implemented to announce such planned events to avoid any discontinuity, (such as setting SISA to state 255), the DVS is currently not properly used and is not required within the current Galileo design. It is therefore available to alert any user within 30 seconds (maximum update rate of DVS at user level) of onboard events, like a detected onboard frequency jump. Also minor updates of the navigation message (SIS-ICD) are envisaged for FOC (and IOV if possible), to allow for further information transmission that can be applied at user level. A dedicated flag directly onboard accessible for detected master clock frequency jump events could be foreseen to avoid the use of DVS (for whatever reason).

Furthermore, information regarding which master clock type is currently used onboard the satellite is not available at the user level. Such information is available at GCS level, and can be easily implemented via the available spare bits within the navigation message, just by defining and setting a RAFS bit.

With such information available at user level dedicated algorithms can be implemented, optimized for the currently used technology, which is different if PHM (i.e., maser without frequency jumps) is used as master clock, or RAFS (i.e., rubidium clock with frequency jumps). Currently there are even at least two spare bits on each page for the clock corrections available, which is considered as the ideal place for such a bit to inform the user about the currently selected master clock technology.

If variable or configurable onboard frequency jump barrier thresholds are used, such information will also be provided to the user via minor SIS-ICD updates, using spare bits properly. Note that plenty of spare bits are currently available in all messages, and accordingly such data provision is considered feasible. Without such information, a predefined threshold that must be as high as the largest onboard satellite clock jump barrier threshold needs to be applied, which can hardly be changed over system lifetime.

FIG. 5 illustrates the currently UNAV message page (page 5) that also includes the DVS. It can be seen that 23 spare bits are available on page 5, which can be used for the relevant information of master clock type, threshold magnitude, and even jump flag to maintain current DVS use.

Whenever the newly transmitted navigation data once again accurately represents the changed satellite clock characteristics, (e.g., after 6 hours), the DVS or new flag can be unset by the GCS (after additional performance checks at GMS level if required), but this might be only possible once per orbit (i.e., every 14 hours, with the current design). To allow shortened outage periods, this could also be done automatically by the satellite after a configurable time period.

4. Use of Detection Information at User Level

Once a satellite master clock frequency jump is detected onboard the satellite and the relevant information is broadcast, such information can be used differently at various levels depending on the service.

Open Service User

If the frequency jump detection information is provided via the DVS, the open service user is also informed, since he is able to receive the DVS flag. However, he does not need to apply such information, since it has been demonstrated that its overall service performance can still be maintained on average, even in case of clock frequency jump occurrence, as already measured in early Galileo experimentation campaigns.

Due to further rubidium clock design improvements for IOV and FOC, the clock frequency jump problem will be reduced even further, i.e., in such configuration the open service user will be even less affected, and will meet its service performance specifications in terms of positioning accuracy, and availability of such positioning solution.

However, since for many constellations the positioning solution might be within specification on average over system lifetime (i.e., 20 years) and averaged over all possible states (27 satellites available, 26 available, etc.), but is not within specification for the current epoch and location, the open service user could also exclude the flagged satellite if a sufficient number of other signals that are not flagged are available. On the other hand there might be users that have to operate with few satellites available (e.g., in urban scenarios in cities with blocked signals, etc.), which are not interested in extremely accurate signals, and which could allow for higher range errors. For such users it would be helpful to maintain the flagged satellite.

In any case the information is available at user level, so that the final decision is with the open service user, and can be locally applied according to its needs.

Integrity Service User

For integrity user (SOL and PRS) the detected satellite that is affected by a satellite clock frequency jump must be excluded from the integrity risk computation algorithm, since the transmitted SISA does not consider the additional range bias as attributable to the frequency jump; i.e., the provided SISA might not overbound the real signal-in-space (SIS) error.

Since all other satellites that might be affected by clock frequency jumps that are below the satellite onboard frequency barrier threshold also transmit SISA values that do not consider the (not detected) worst-case jump impact, it is proposed to inflate the relevant SISA information at user level; that is, to allow flexible use of inflation according to its specific needs and available information.

Several options are possible depending on the available information. If the user is informed about the currently used onboard master clock technology (PHM or RAFS), he can already distinguish between the need for SISA inflation, which is required for RAFS only. Furthermore if flexible satellite barriers are used and the threshold magnitude for each satellite is known at user level, the inflation for RAFS signals can be optimized accordingly. If no such information is available and/or equal hard coded thresholds are used in each satellite, the highest threshold needs to be applied to properly inflate the RAFS SISA.

The following equation can be used to inflate the SISA in case of biases b and standard deviation a of the underlying Gaussian distribution.

$$SISA_i = \sigma \cdot e^{\frac{b^2}{2 \cdot \sigma^2}}$$

To conservatively upper bound the inflation of SISA in order to ensure overbounding of the signal-in-space accuracy, the received SISA for the relevant satellite can be used as standard deviation σ, and the applicable onboard clock frequency jump barrier threshold as bias b (either received for the specific satellite via the navigation message, or hard defined also within the receiver).

Figure 6:
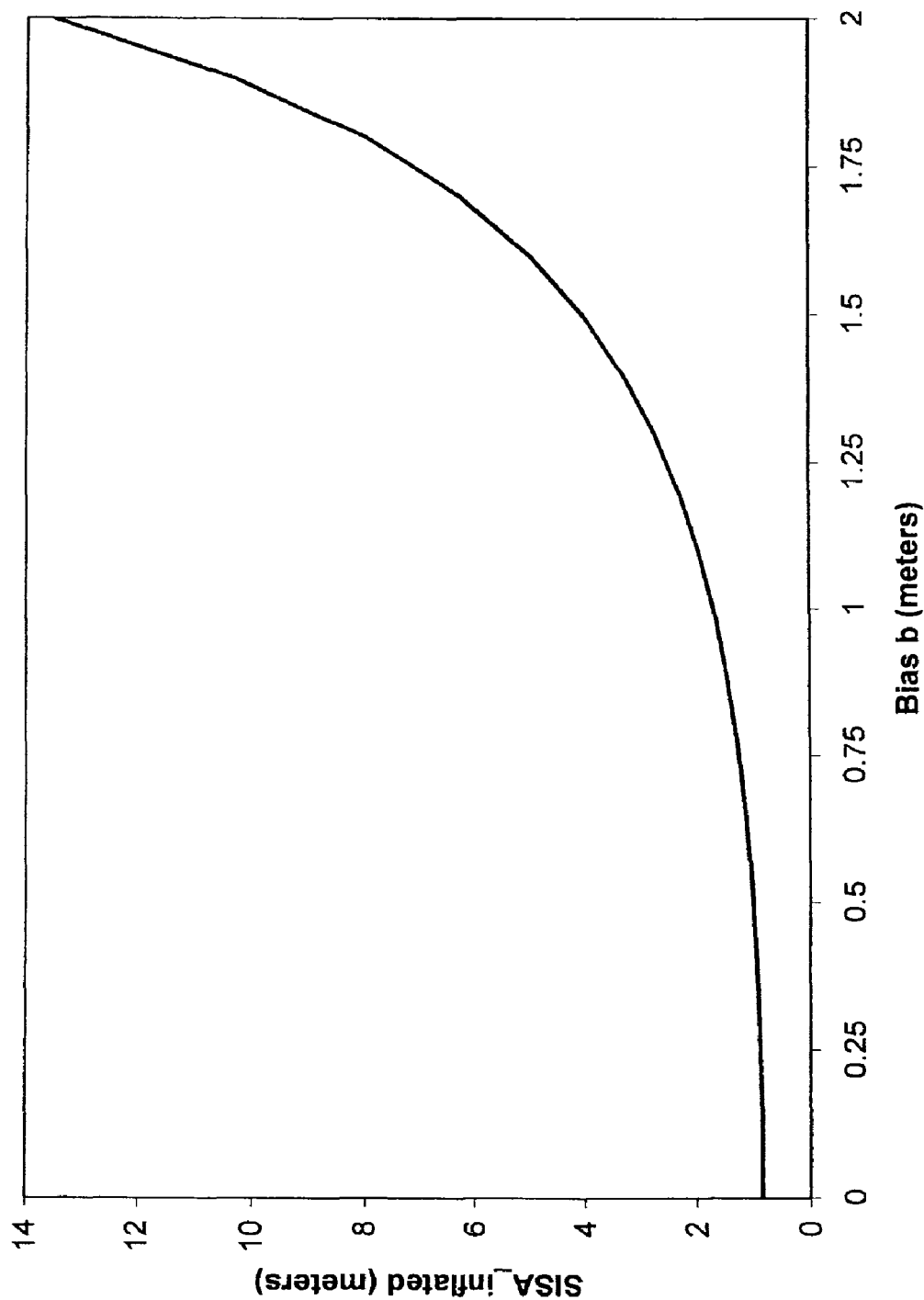
FIG. 6 shows the SISA inflation for 85 cm standard deviation for different biases up to typical 2 m.

FIG. 6 illustrates SISA inflation for 85 cm standard deviation (received SISA) for different biases up to typical 2 meters.

In case of typical 1.0 m bias or onboard jump barrier threshold, which represents a typical frequency jump of 5 e-13 s/s (for 100 minutes navigation data validity time), the inflated SISA would correspond to a value of around 1.7 meters, which is two times higher than the 85 cm SISA upper bound specification that is required to globally achieve integrity service performance. However, since only RAFS signals are affected, the final impact on the integrity service performance is limited, especially if PHM is considered as master clock.

To further improve this impact on the Galileo integrity service performance, it is proposed to further benefit from the age of the navigation data. If for the affected satellite new navigation data are available (e.g., not older than 30 minutes), a 5 e-13 s/s threshold onboard the satellite would not impose a 1.0 meter bias (with related SISA inflation to 1.7 m), but only a bias of around 3540 cm, for which almost no inflation is required.

Therefore it is proposed to also consider the navigation data age for the SISA inflation at user level, to limit the impact of clock frequency jumps even further. This can be implemented at user level through the relevant equations, but even easier through lookup tables to limit the required processing time.

It should be noted that if longer periods are required onboard the satellite to detect the frequency jump, this can also be implemented through proper SISA inflation with worst-case jump magnitude (not threshold), navigation data age, and period required for detection plus 30 seconds. However, this will be driven by first analysis and test results with onboard barriers and can be easily implemented at user level.

Ground Mission Segment Level Use

Relevant inflation could also be done at ground mission level, since all necessary information is available there. However, this would remove the possibility of reducing the impact of frequency jumps with respect to navigation data age directly at user level. It would avoid more complex user algorithms, which is however not considered critical for the proposed concept, since not complex algorithms are required.

Furthermore the DVS (or similar used spare bits) is also received at GMS level and can be used to remove measurements for the signal-in-space error statistics (required for HSISA) that are degraded due to onboard clock frequency jumps above the onboard barrier threshold. Thus, historical SISA data is gathered only for relevant signal-in-space error (SISE) estimations below the threshold.

This further means that SISE statistics also include degraded ranging accuracy data due to satellite frequency jumps that are below the threshold, which will slightly increase the SISE standard deviation and thus the transmitted SISA, but will still not provide the required inflation to ensure overbounding at user level in the presence of biases, since the jump events are collected together with SISE periods not affected by jumps. (That is, the effect is averaged over long periods.) This proper overbounding must be done at user level as already described in detail above.

Note that such use of affected SISE measurements, and related increase of transmitted SISA values, further decreases the user level SISA inflation, since for higher standard deviations σ, larger biases b have a less significant impact. This further improves the service availability.

5. Summary

The invention provides a method for performing parts of the integrity monitoring of a GNSS, such as Galileo, directly onboard the satellite, with respect in particular to satellite frequency jumps. This is required due to the limited monitoring accuracy on ground where several other error sources (and noise contributions) are present. Smaller errors cannot be detected but impose severe integrity problems.

According to the invention the satellite monitors autonomously its clock performance and raises a service status flag that informs any user of the occurrence of a jump, within a very short time period. The threshold to set such flag can be variably implemented, and can also be set to infinity if no such monitoring is required, e.g., due to PHM master use (without jumps), or in case of much smaller jump magnitudes in FOC and IOV due to better or further improved RAFS performances.

Together with the additional information about the master clock type, the user can distinguish between PHM and RAFS use, and can inflate the SISA information according to the navigation data age, as well as the used onboard barrier threshold, which represents the worst case jump that is not detected.

Therefore the invention ensures a valid Galileo integrity service, with only minor changes on the current overall Galileo design (Phase CDE1/IOV system and space segment). It further provides full flexibility to the user as well as to the service provider, since the user will decide how to use the jump flag information (together with the relevant information) according to its specific needs, and the service provider can optimize the monitoring concept according to test and verification results (tuning of onboard barriers). Such concept might also be mandatory for Galileo certification and accreditation.

Briefly summarized, the invention proposes
1. A method to monitor, onboard a Galileo satellite, its clock's performance to detect satellite clock frequency jumps above a configurable or fixed threshold, with minor Galileo satellite design impact for FOC and IOV, by comparing master and backup clock performances/frequencies onboard the satellite.
2. A method to use already available system status flags and spare bits according to item 1 outcomes/detection events, to inform any user within short time periods about the occurrence of a jump, as well as barrier threshold magnitude and master clock type.
3. Flexible methods to properly apply the provided information according to item 2, optimized for the specific needs according to open and integrity services, as well as a method to modify already provided integrity data (SISA) for satellite which have not been flagged, to ensure overbounding and thus integrity.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for enhancing integrity performance of a global navigation satellite system that includes a plurality of navigation satellites, each of which has a master clock, said method comprising:
    on board at least one of said satellites, monitoring a master clock signal generated by the master clock onboard said at least one of the satellites using a clock monitoring and control unit, to detect a frequency jump, wherein the monitoring comprises comparing a frequency of an untransmitted master clock signal with a frequency of an untransmitted backup clock signal; and
    said at least one of the satellites signaling a detected frequency jump of said master clock signal.

2. The method of claim 1, wherein the backup clock signal is generated by a backup clock onboard said at least one of the satellites, and wherein said monitoring comprises:
    comparing a detected frequency jump with a threshold; and
    if the detected frequency jump exceeds the threshold, generating a frequency jump detection event.

3. A method for enhancing integrity performance of a global navigation satellite system that includes a plurality of navigation satellites, each of which has a master clock, said method comprising:
    on board at least one of said satellites, monitoring a master clock signal generated by the master clock onboard said at least one of the satellites, to detect a frequency jump; and
    said at least one of the satellites signaling a detected frequency jump of said master clock signal,
    wherein said monitoring comprises
        comparing the frequency of an untransmitted master clock signal with the frequency of an untransmitted backup clock signal, which is generated by a backup clock, onboard said at least one of the satellites, for detecting a frequency jump of a clock signal;
        comparing a detected frequency jump with a threshold; and
        if the detected frequency jump exceeds the threshold, generating a frequency jump detection event,
    wherein the comparing step comprises
    estimating the frequency of each of said clock signals based on phase measurement values of the respective clock signal; and
    comparing the estimated frequencies of both clock signals;
    wherein the comparing of a detected frequency jump with a threshold comprises,
        detecting a difference between the estimated frequencies;
        comparing the detected difference with the threshold; and
        generating the frequency jump detection event if the detected difference exceeds the threshold.

4. The method of claim 2, wherein the threshold is a remotely configurable parameter.

5. The method of claim 1, wherein the monitoring step comprises estimating the frequency of the master clock signal using a reference clock signal that is generated onboard of the satellite by a reference clock.

6. The method of claim 1, wherein the step of signaling of a detected frequency jump of the master clock signal comprises setting a flag in a navigation message broadcast by the satellite.

7. The method of claim 6, wherein a Data Validity Status —DVS—Flag is used as the flag for signaling a detected frequency jump.

8. The method of claim 1, wherein the signaling of a detected frequency jump of the master clock signal further comprises signaling of at least one of a used master clock type and a threshold that is implemented onboard the satellite for monitoring the frequency jump of the master clock signal, at a user level of a global navigation satellite system.

9. Apparatus for detecting frequency jumps of a navigation satellite's master clock, said apparatus comprising:
    a clock monitoring and control unit that monitors a master clock signal generated by the master clock onboard the satellite, for a frequency jump by comparing a frequency of an untransmitted master clock signal with a frequency of an untransmitted backup clock signal; and
    a frequency jump signaling unit which signals a detected frequency jump of the master clock signal.

10. A navigation satellite comprising the apparatus of claim 9.

11. A receiver for receiving navigation messages from the navigation satellite of claim 10, and being adapted for processing a received navigation message by:

detecting a signal indicative of a detected frequency jump of the master clock signal of the satellite in a navigation message from a particular satellite; and a step comprising one of i) excluding navigation messages from the particular satellite, and ii) inflating a relevant signal in space accuracy information (SISA) for said particular satellite.

12. The receiver of claim 11, wherein said step of inflating the relevant SISA is performed according to the following equation:

$$SISA_i = \sigma \cdot e^{\frac{b^2}{2 \cdot \sigma^2}},$$

wherein b is a bias in meters and $\sigma$ is a standard deviation of an underlying Gaussian distribution.

13. The receiver of claim 12, wherein:

the SISA received with a navigation message from the satellite is used as the standard deviation $\sigma$; and the threshold applicable for frequency jumps of the satellite's master clock is used as bias b.

14. The receiver of claim 11, wherein the receiver is further adapted to consider age of the navigation data received with a navigation message, for inflating the relevant SISA information.

15. The method of claim 1, wherein the comparing step comprises:

estimating the frequency of each of said clock signals based on phase measurement values of the respective clock signal; and comparing the estimated frequencies of both clock signals;

wherein the comparing of a detected frequency jump with a threshold comprises, detecting a difference between the estimated frequencies;

comparing the detected difference with the threshold; and generating the frequency jump detection event if the detected difference exceeds the threshold.

\* \* \* \* \*